(12) United States Patent
Marubayashi et al.

(10) Patent No.: US 12,519,187 B2
(45) Date of Patent: Jan. 6, 2026

(54) SECONDARY BATTERY AND ASSEMBLED BATTERY, AND PRODUCTION METHOD THEREOF

(71) Applicant: PRIME PLANET ENERGY & SOLUTIONS, INC., Tokyo (JP)

(72) Inventors: Hironori Marubayashi, Sumoto (JP); Ryoichi Wakimoto, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 524 days.

(21) Appl. No.: 17/994,887

(22) Filed: Nov. 28, 2022

(65) Prior Publication Data

US 2023/0170587 A1 Jun. 1, 2023

(30) Foreign Application Priority Data

Nov. 30, 2021 (JP) ................. 2021-193735

(51) Int. Cl.
*H01M 50/566* (2021.01)
*B23K 26/21* (2014.01)
(Continued)

(52) U.S. Cl.
CPC ....... *H01M 50/566* (2021.01); *H01M 50/514* (2021.01); *H01M 50/533* (2021.01);
(Continued)

(58) Field of Classification Search
CPC ............ H01M 50/566; H01M 50/514; H01M 50/533; H01M 50/553; H01M 50/583; H01M 2200/103; H01M 50/176; H01M 50/505; H01M 50/531; H01M 50/55; H01M 50/15; H01M 10/0525; H01M 10/058; H01M 50/502; H01M 50/507; H01M 50/543; H01M 50/564; H01M 50/103; H01M 2220/20; B23K 26/21; B23K 2101/36; Y02E 60/10; Y02P 70/50
See application file for complete search history.

(56) References Cited

U.S. PATENT DOCUMENTS

2017/0018758 A1\* 1/2017 Sawada ............... H01M 50/553
2019/0221791 A1 7/2019 Wakimoto
(Continued)

FOREIGN PATENT DOCUMENTS

EP 4009408 A1 6/2022
JP 2000-021542 A 1/2000
(Continued)

*Primary Examiner* — Lisa S Park
(74) *Attorney, Agent, or Firm* — Finnegan, Henderson, Farabow, Garrett and Dunner, LLP (57) ABSTRACT

Provided is art that allows joining an external conductive member and a bus bar more stably. A method for producing a secondary battery disclosed herein has: an attachment step; an arrangement step; a covering step; and, a joining step. The external conductive member has a recess sunk from the upper surface, around a through-hole. In the joining step, the external conductive member and the terminal are joined in a state where an edge portion of a cover member is disposed between a planned joint portion, and an outer peripheral edge of the recess, in a cross-sectional view along a direction of penetration into the through-hole.

8 Claims, 6 Drawing Sheets

(51) Int. Cl.
  *H01M 50/514* (2021.01)
  *H01M 50/533* (2021.01)
  *H01M 50/553* (2021.01)
  *H01M 50/583* (2021.01)
  *B23K 101/36* (2006.01)

(52) U.S. Cl.
  CPC ....... *H01M 50/553* (2021.01); *H01M 50/583* (2021.01); *B23K 26/21* (2015.10); *B23K 2101/36* (2018.08); *H01M 2200/103* (2013.01)

(56) References Cited

U.S. PATENT DOCUMENTS

| | | | |
|---|---|---|---|
| 2019/0260008 A1* | 8/2019 | Koike | ............... H01M 10/0585 |
| 2020/0091492 A1 | 3/2020 | Guen | |
| 2022/0181755 A1 | 6/2022 | Wakimoto | |

FOREIGN PATENT DOCUMENTS

| | | |
|---|---|---|
| JP | 2009-166050 A | 7/2009 |
| JP | 2010-142827 A | 7/2010 |
| JP | 2019-125491 A | 7/2019 |
| JP | 2022-088806 A | 6/2022 |

\* cited by examiner

SECONDARY BATTERY AND ASSEMBLED BATTERY, AND PRODUCTION METHOD THEREOF

CROSS REFERENCE TO RELATED APPLICATIONS

The present application claims priority under Japanese Patent Application No. 2021-193735 filed on Nov. 30, 2021, the entire contents whereof are incorporated into the present specification by reference.

BACKGROUND OF THE DISCLOSURE

1. Technical Field

The present disclosure relates to a secondary battery, to an assembled battery, and to respective methods for producing the foregoing.

2. Background

Assembled batteries formed through mutual electrical connection of multiple unit cells are used for instance as high-output power sources for vehicle drive. Examples of unit cells that constitute such an assembled battery include secondary batteries such as lithium ion secondary batteries. This kind of secondary battery has for instance an electrode body that constitutes a power generation element, a battery case that accommodates the electrode body, terminals electrically connected to the electrode body, and external conductive members joined to the terminals outside the battery case. Members may be joined to other members in the production process of the secondary battery. Japanese Patent Application Publication No. 2019-125491 describes projecting energy rays to thereby join, to each other, members that make up a secondary battery.

SUMMARY OF THE INVENTION

In an assembled battery, for instance two adjacent unit cells are connected to each other through bridging, via bus bars, of the external conductive members of the two unit cells. The inventors aspire herein to achieve more stable joining of external conductive members and bus bars.

The art disclosed herein provides a method for producing a secondary battery that has: an electrode body including a positive electrode and a negative electrode; a battery case that accommodates the electrode body; a terminal electrically connected to the positive electrode or the negative electrode, and attached to the battery case; and an external conductive member having a through-hole, and joined to the terminal outside the battery case. The above production method has: an attachment step of attaching the terminal to the battery case; an arrangement step of arranging part of the terminal, attached to the battery case, within the through-hole of the external conductive member; a covering step of, after the arrangement step, covering at least part of an upper surface of the external conductive member with a cover member; and a joining step of, after the covering step, joining the external conductive member and the terminal through irradiation of energy rays. The external conductive member has a substantially annular recess, sunk from the upper surface of the external conductive member, around the through-hole; and in the joining step, the external conductive member and the terminal are joined in a state where an edge portion of the cover member is disposed between a planned joint portion of the external conductive member and the terminal, and an outer peripheral edge of the recess, in a cross-sectional view along a direction of penetration into the through-hole.

A production method having such features adhesion of spatter to the upper surface of the external conductive member can be suppressed, since the external conductive member and the terminal are joined to each other in a state where the upper surface of the external conductive member around the through-hole is covered with the cover member. The external conductive member and the bus bar can be joined more stably as a result.

In a preferred implementation of the production method disclosed herein, the cover member has an opening; and the inner diameter of the opening is smaller than the outer diameter of the recess. The effect of the art disclosed herein can be realized yet better by using a cover member having such a configuration.

In another preferred implementation of the production method disclosed herein, a region of overlap of the cover member and the recess, in a plan view, has an annular shape. Such a configuration yet better allows realizing the effect of the art disclosed herein.

In another preferred implementation of the production method disclosed herein, a shortest distance W1 from a peripheral edge of the through-hole up to the outer peripheral edge of the recess, in a plan view, is 2 mm or larger. Such a configuration yet better allows realizing the effect of the art disclosed herein.

In another preferred implementation of the production method disclosed herein, an inner wall surface of the recess is a tapered surface that widens from a bottom surface of the recess towards the upper surface of the external conductive member. In addition to the above effects, such a configuration allows suppressing deformation of the external conductive member at the time of formation of the recess.

In another preferred implementation of the production method disclosed herein, the cover member having an opening is used in the covering step. The upper surface of the external conductive member is covered by the cover member so that an inner edge of the opening overlaps the tapered surface. In addition to the effect of stabilizing joining of the external conductive member and the bus bar, such a configuration allows eliciting also the effect of suppressing deformation of the external conductive member at the time of formation of the recess.

In another preferred implementation of the production method disclosed herein, a ratio (W2/W1) of the shortest distance W1 and a shortest distance W2 from a boundary of the tapered surface and the bottom surface, in a plan view, up to the outer peripheral edge of the recess, is 0.4 or higher. Such a configuration allows bringing out both the above joining stabilization effect and the above deformation suppression effect.

The art disclosed herein provides also a method for producing an assembled battery in which multiple unit cells are connected to each other with a bus bar. The method for producing an assembled battery includes producing a secondary battery as the unit cell, in accordance with the above method for producing a secondary battery, and arranging the bus bar on the upper surface of the external conductive member, and connecting the external conductive member and the bus bar. An assembled battery production method having such features allows joining bus bars to external conductive members more stably.

The art disclosed herein provides also a secondary battery that has: an electrode body including a positive electrode and a negative electrode; a battery case that accommodates the electrode body; a terminal electrically connected to the positive electrode or the negative electrode, and attached to the battery case; and an external conductive member joined to the terminal outside the battery case. In this secondary battery the external conductive member has a through-hole, and part of the terminal is disposed within the through-hole. Around the through-hole there are provided a joint portion of the external conductive member and the terminal, and a substantially annular recess, sunk from the upper surface of the external conductive member. A shortest distance W1 from a peripheral edge of the through-hole up to the outer peripheral edge of the recess, in a plan view, is 2 mm or larger.

In a secondary battery having such a configuration the external conductive member and the terminal disposed within the through-hole that, in turn provided within the recess sunk from the upper surface of the external conductive member, are joined to each other in the periphery of the through-hole. The terminal and the external conductive member can be joined to each other at the portion recessed from the upper surface of the external conductive member. There is a distance of 2 mm or more from the peripheral edge of the through-hole to the outer peripheral edge of the recess, in a plan view. The upper surface can be kept removed from the joint site of the terminal and the external conductive member, and adhesion of spatter to the upper surface can be suppressed at the time of joining. The external conductive member and the bus bar can be joined more stably as a result.

In a preferred implementation of the secondary battery disclosed herein, an inner wall surface of the recess is a tapered surface that widens from a bottom surface of the recess towards the upper surface of the external conductive member. In addition to the effect of stabilizing joining of the external conductive member and the bus bar, such a configuration allows eliciting the effect of suppressing deformation of the external conductive member at the time of formation of the recess, and the effect of suppressing generation of heat at the time of energization.

In another preferred implementation of the secondary battery disclosed herein, a ratio (W2/W1) of the shortest distance W1 and a shortest distance W2 from a boundary of the tapered surface and the bottom surface, in a plan view, up to the outer peripheral edge of the recess, is 0.4 or higher. Such a configuration allows yet better bringing out the above effects.

In another preferred implementation of the secondary battery disclosed herein, the secondary battery has a current collector member that electrically connects the positive electrode or the negative electrode, and the terminal. A fuse portion is formed in the current collector member. The fuse portion is configured to fuse when a current of 1000 A or more flows in the secondary battery. In addition to the above effects, such a configuration also further enhances safety.

The art disclosed herein further provides an assembled battery in which multiple unit cells are connected to each other by way of a bus bar. The assembled battery has the above secondary battery, as the unit cell. The bus bar is disposed on the upper surface of the external conductive member, and the unit cells are connected to each other by way of the bus bar. In an assembled battery having such a configuration the bus bar is joined more stably to the external conductive member.

In a preferred implementation of the assembled battery disclosed herein, the bus bar covers the through-hole and the recess. In addition to the above effects, such a configuration allows bringing out the effect of suppressing generation of heat at the time of energization.

DETAILED DESCRIPTION OF THE PREFERRED EMBODIMENTS

Preferred embodiments of the art disclosed herein will be explained next with reference to accompanying drawings. Needless to say, the embodiments described explained herein are not meant to limit the present invention in any particular way. The drawings are drawn schematically, and do not necessarily reflect actual items. Members and portions eliciting identical effects are denoted by identical reference symbols, and a recurrent explanation thereof will be omitted. Any features other than the matter specifically set forth in the present specification and that may be necessary for carrying out the art disclosed herein (for instance general configurations and production processes of batteries secondary batteries and not being characterizing features of the art disclosed herein) can be grasped as instances of design matter for a person skilled in the art based on known art in the relevant technical field. The art disclosed herein can be realized on the basis of the disclosure of the present specification and common technical knowledge in the relevant technical field. In the present specification a numerical value range notated as "A to B" denotes values "equal to or larger than A and equal to or smaller than B", and may encompass instances of values being greater than A and smaller than B.

In the present specification, the term "secondary battery" denotes a power storage device in general capable of being repeatedly charged and discharged, and encompasses conceptually so-called storage batteries (chemical batteries) such as lithium ion secondary batteries and nickel-metal hydride batteries, as well as capacitors such as electrical double layer capacitors.

The reference symbol X in the reference drawings of the present specification denotes a "depth direction", the reference symbol Y denotes a "width direction", and the reference symbol Z denotes a "height direction". Further, F in the depth direction X denotes "front" and Rr denotes "rear". Similarly, L in the width direction Y denotes "left" and R denotes "right". Further, U in the height direction Z denotes "up (top)" and D denotes "down (bottom)". However, the foregoing are merely directions for convenience of explanation, and are not meant to limit in any way the manner in which a secondary battery is installed, or the manner in which an assembled battery is installed.

First Embodiment

Secondary Battery 1

Figure 1:
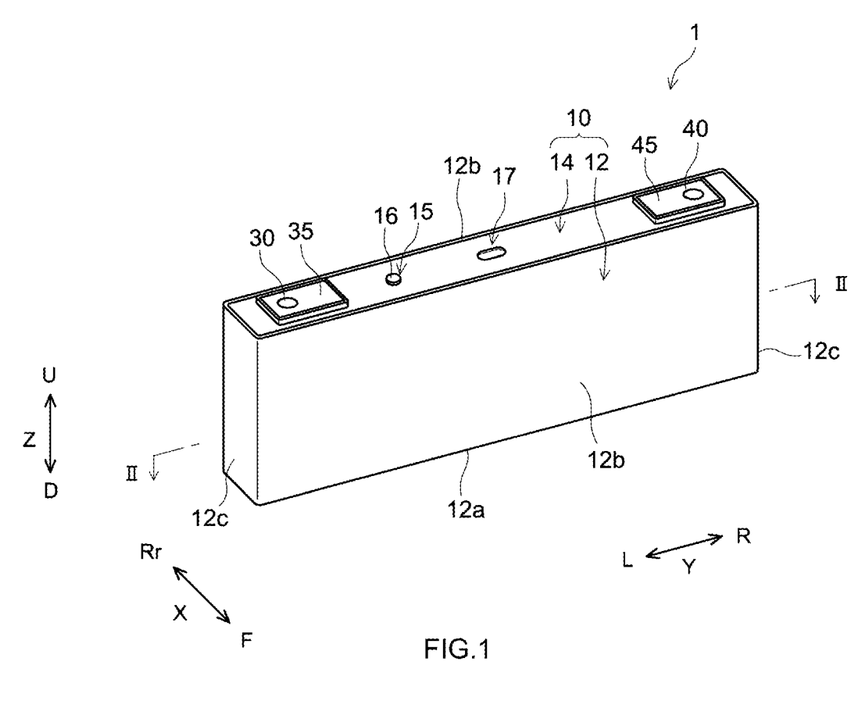
FIG. 1 is a perspective-view diagram illustrating schematically a secondary battery according to an embodiment.
Figure 2:
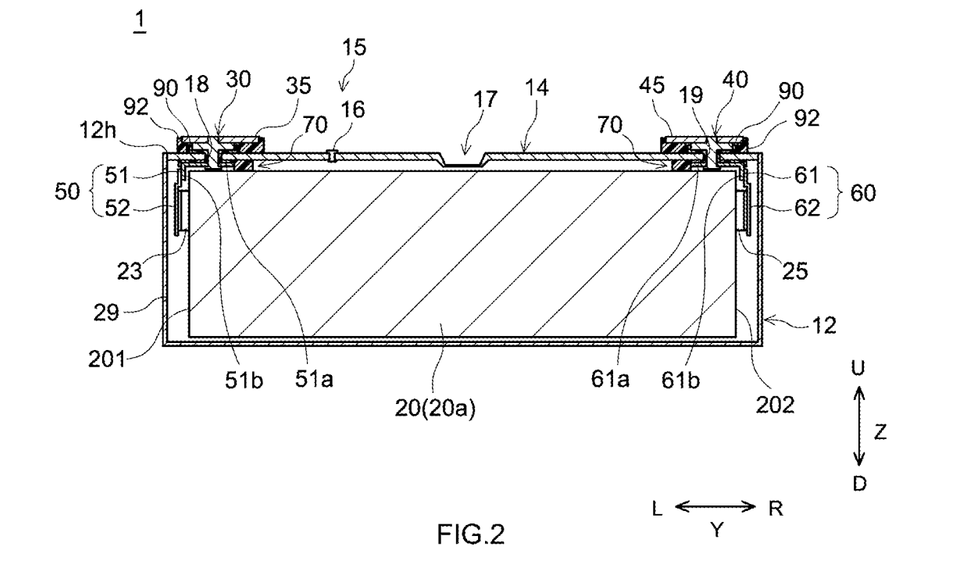
FIG. 2 is a cross-sectional diagram along line II-II of FIG. 1.

FIG. 1 is a perspective-view diagram illustrating schematically a secondary battery according to an embodiment. FIG. 2 is a cross-sectional diagram along line II-II of FIG. 1. As illustrated in FIG. 1 and FIG. 2, the secondary battery 1 has a battery case 10, an electrode body 20, a positive electrode terminal 30, a negative electrode terminal 40, external conductive members 35, 45, a positive electrode current collector member 50, a negative electrode current collector member 60, insulators 70, gaskets 90 and external insulating members 92. Although explained in detail further on, the positive electrode current collector member 50 has a first collector portion 51 and second collector portions 52. The negative electrode current collector member 60 has a first collector portion 61 and second collector portions 62. In the present embodiment the secondary battery 1 is a lithium ion secondary battery. Although not illustrated in the figures, the secondary battery 1 further includes an electrolyte solution. Electrolyte solutions used in various lithium ion secondary batteries may be used, without particular limitations, as the electrolyte solution. The electrolyte solution is not a characterizing feature of the art disclosed herein, and hence a detailed explanation thereof will be omitted.

In the present embodiment the battery case 10 is a housing that accommodates the electrode body 20 and the electrolyte solution. The battery case 10 has herein a flat and bottomed cuboid (square) external shape. The material of the battery case 10 is not particularly limited, and may be identical to conventionally used materials. The battery case 10 is preferably made of a metal, and is more preferably made up of for instance aluminum, an aluminum alloy, iron, or an iron alloy.

In the present embodiment the battery case 10 has an exterior body 12 and a sealing plate (lid) 14. As illustrated in FIG. 1, the exterior body 12 includes a flat rectangular bottom portion 12a, a pair of mutually opposing first side walls 12b extending in the height direction Z from a pair of opposing sides of the bottom portion 12a, and a pair of mutually opposing second side walls 12c extending in the height direction Z from another pair of opposing sides of the bottom portion 12a. In the present embodiment the first side walls 12b are long side walls extending from a pair of opposing long sides of the bottom portion 12a. The second side walls 12c are short side walls extending from a pair of opposing short sides of the bottom portion 12a. In the present embodiment the surface area of the second side walls 12c is smaller than the surface area of the first side walls 12b. A portion facing the bottom portion 12a and surrounded by the pair of first side walls 12b and the pair of second side walls 12c constitutes an opening 12h. A sealing plate 14 is a member that seals the opening 12h of the exterior body 12. The sealing plate 14 opposes the bottom portion 12a of the exterior body 12. The sealing plate 14 has a substantially rectangular shape in a plan view. The battery case 10 is integrated through joining of the sealing plate 14 to the peripheral edge of the opening of the exterior body 12. The joining means is for instance welding such as laser welding. The battery case 10 is hermetically (air-tight) sealed.

The sealing plate 14 has a liquid injection hole 15 and a gas discharge valve 17. The purpose of the liquid injection hole 15 is to inject an electrolyte solution after assembly of the sealing plate 14 to the exterior body 12. The liquid injection hole 15 is sealed by a sealing member 16. The gas discharge valve 17 is a thin portion configured to break, and release gas to the exterior of the battery case 10, when the pressure within the battery case 10 exceeds a predetermined value.

Figure 3:
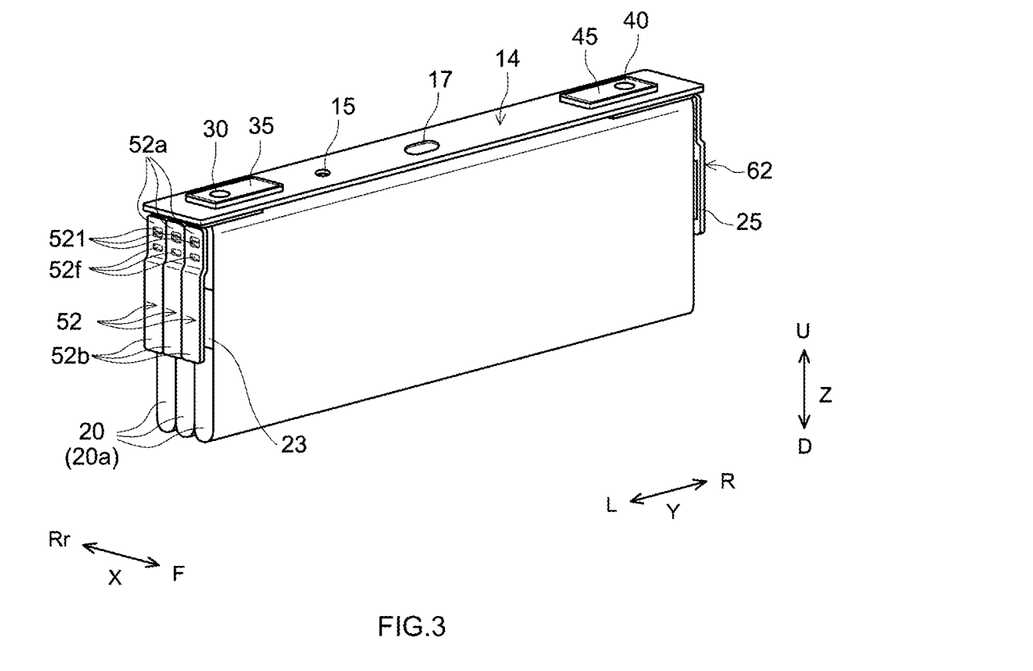
FIG. 3 is a perspective-view diagram illustrating an electrode body attached to a sealing plate.
Figure 4:
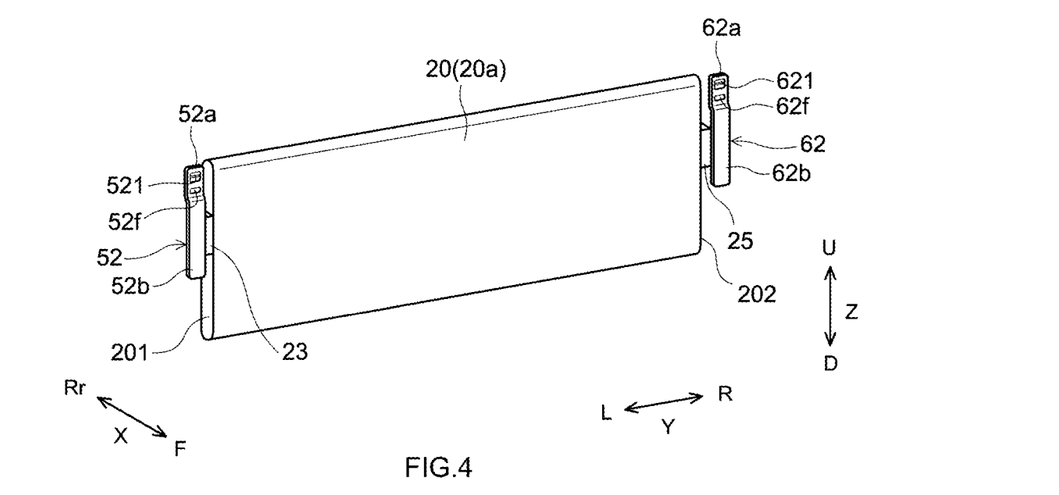
FIG. 4 is a perspective-view diagram illustrating an electrode body having second collector portions attached thereto.

FIG. 3 is a perspective-view diagram illustrating an electrode body attached to a sealing plate. FIG. 4 is a perspective-view diagram illustrating an electrode body having second collector portions attached thereto. As illustrated in FIG. 3, the secondary battery 1 has three electrode assemblies 20. As illustrated in FIG. 3 and FIG. 4, the second collector portions 52 of the positive electrode current collector member 50 are disposed on one side in a long-side direction Y (left side in FIG. 3 and FIG. 4), and the second collector portions 62 of the negative electrode current collector member 60 are disposed on the other side (right side in FIG. 3 and FIG. 4), the collector portions of respective polarity being connected in parallel. As illustrated in FIG. 2, one or more electrode assemblies 20 are disposed inside the exterior body 12 while covered with an electrode body holder 29 made up of a resin-made sheet of polypropylene (PP) or the like. The number of electrode assemblies 20 accommodated in the secondary battery 1 is not particularly limited, and may be for instance one or two, or four or more.

Figure 5:
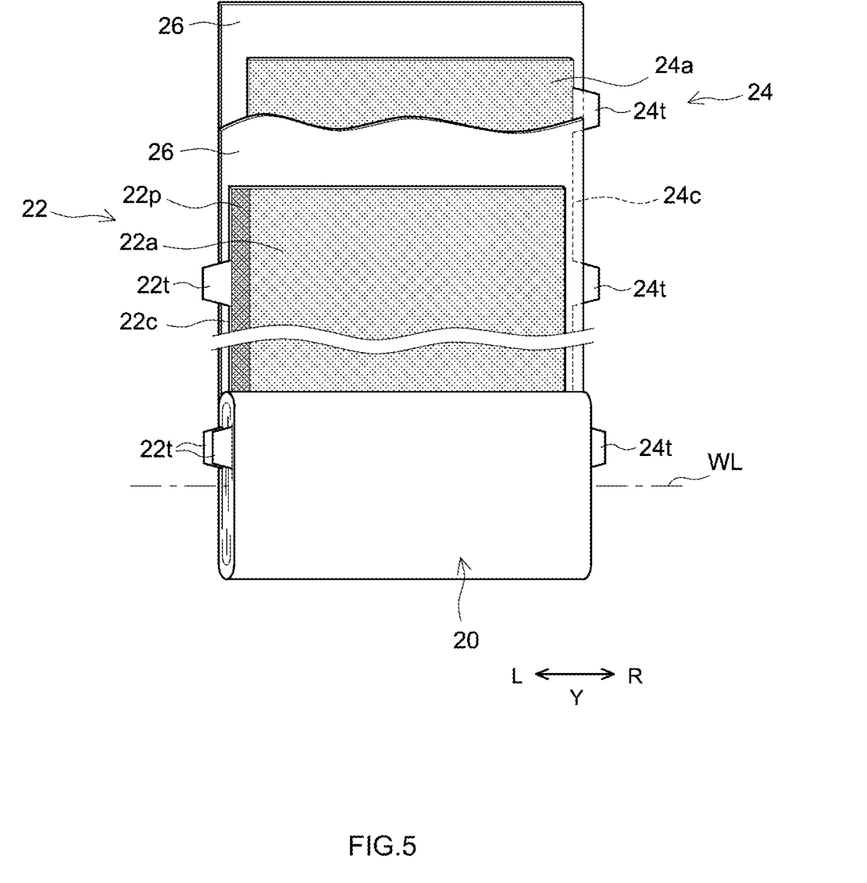
FIG. 5 is a schematic diagram for explaining the configuration of an electrode body.

Each electrode body 20, which is a power generation element of secondary battery 1, has a positive electrode and a negative electrode. FIG. 5 is a schematic diagram for explaining the configuration of the electrode body. As illustrated in FIG. 5, each electrode body 20 has a positive electrode plate 22, a negative electrode plate 24, and a respective separator 26 disposed between the positive electrode plate 22 and the negative electrode plate 24. As illustrated in FIG. 5, the electrode body 20 is a wound electrode body in which a strip-shaped positive electrode plate 22 and a strip-shaped negative electrode plate 24 are laid up on each other via a respective strip-shaped separator 26, with the resulting stack wound in the longitudinal direction. As illustrated in FIG. 2 to FIG. 4, the electrode body 20 has a main body 20a, a positive electrode tab group 23, and a negative electrode tab group 25. The main body 20a is a portion at which the positive electrode plate 22, the negative electrode plate 24, and the separators 26 are laid up on each other, and has for instance a flat shape.

The width of the main body 20a is for instance 20 cm or larger. The width of the main body 20a may be for instance 25 cm or larger. The width of the main body 20a may be for instance 40 cm or smaller, or 30 cm or smaller. In the present specification the term "width of the main body 20a" denotes (width direction Y in FIG. 5) instance the length of the main body 20a in the transverse direction of the negative electrode plate 24.

As illustrated in FIG. 1, FIG. 2 and FIG. 5, the electrode body 20 is disposed inside the exterior body 12 so that a winding axis WL is parallel to the width direction Y. In the present embodiment the electrode body 20 is disposed inside the exterior body 12 in an orientation such that the winding axis WL is parallel to the bottom portion 12a and perpendicular to the second side walls 12c. The end surfaces of the electrode body 20 in the direction along the winding axis WL oppose respective second side walls 12c of the exterior body 12. In the present specification, for convenience of explanation, the end surface of each electrode body 20 (for instance the main body 20a) opposing a respective second side wall 12c, on the side closer to the positive electrode current collector member 50 (left side in the width direction Y, in FIG. 2 and FIG. 4), will be referred to as "first end surface 201". Similarly, the end surface of each electrode body 20 (for instance the main body 20a) opposing a respective second side wall 12c, on the side closer to the negative electrode current collector member 60 (right side in the width direction Y, in FIG. 2 and FIG. 4), will be referred to as "second end surface 202".

The positive electrode plate 22 has an elongated strip-shaped positive electrode current collector foil 22c (for instance of aluminum foil) and a positive electrode active material layer 22a fixed on at least one surface of the positive electrode current collector foil 22c. Although not particularly limited thereto, a positive electrode protective layer 22p may be provided on one side edge portion of the positive electrode plate 22 in the width direction Y, as needed. Materials utilized in this kind of secondary batteries (a lithium ion secondary battery in the present embodiment) can be used, without particular limitations, as the materials that make up the positive electrode active material layer 22a and the positive electrode protective layer 22p; such materials are not a characterizing feature of the art disclosed herein, and accordingly a detailed explanation thereof will be omitted.

A plurality of positive electrode tabs 22t is provided at one end (left end in FIG. 5) of the positive electrode current collector foil 22c in the width direction Y. The positive electrode tabs 22t protrude towards one side in the width direction Y (left side in FIG. 5). The positive electrode tabs 22t are provided at intervals (intermittently) in the longitudinal direction of the positive electrode plate 22. The positive electrode tabs 22t, which are part of the positive electrode current collector foil 22c, constitute a portion (collector foil exposed portion) of the positive electrode current collector foil 22c at which the positive electrode active material layer 22a and the positive electrode protective layer 22p are not formed. In the present embodiment the positive electrode tabs 22t protrude in the width direction Y beyond the separator 26. For instance the positive electrode tabs 22t are stacked at one end (left end in FIG. 5) in the width direction Y, to configure the positive electrode tab group 23 (see FIG. 2 to FIG. 4). As illustrated in FIG. 2, the positive electrode current collector member 50 is joined to the positive electrode tab group 23.

The negative electrode plate 24 has an elongated strip-shaped negative electrode current collector foil 24c (for instance copper foil) and a negative electrode active material layer 24a fixed on at least one surface of the negative electrode current collector foil 24c. Materials utilized in this kind of secondary batteries (a lithium ion secondary battery in the present embodiment) can be used, without particular limitations, as the materials that make up the negative electrode active material layer 24a; such materials are not a characterizing feature of the art disclosed herein, and accordingly a detailed explanation thereof will be omitted.

A plurality of negative electrode tabs 24t is provided at one end (right end in FIG. 5) of the negative electrode current collector foil 24c in the width direction Y. The negative electrode tabs 24t protrude towards one side in the width direction Y (right side in FIG. 5). The negative electrode tabs 24t are provided at intervals (intermittently) in the longitudinal direction of the negative electrode plate 24. The negative electrode tabs 24t, which are part of the negative electrode current collector foil 24c, constitute a portion (collector foil exposed portion) of the negative electrode current collector foil 24c at which the negative electrode active material layer 24a is not formed. In the present embodiment the negative electrode tabs 24t protrude in the width direction Y beyond the separator 26. For instance the negative electrode tabs 24t are stacked at one end (right end in FIG. 5) in the width direction Y, to configure the negative electrode tab group 25 (see FIG. 2 to FIG. 4). As illustrated in FIG. 2, the negative electrode current collector member 60 is joined to the negative electrode tab group 25.

Each separator 26 is a member that insulates the positive electrode active material layer 22a of the positive electrode plate 22 and the negative electrode active material layer 24a of the negative electrode plate 24. The separator 26 constitutes the outer surface of the electrode body 20. For instance, a porous sheet produced out of a resin made up of a polyolefin resin such as polyethylene (PE) or polypropylene (PP) may be used as the separator 26.

As illustrated in FIG. 1 to FIG. 3, the positive electrode terminal 30 and the negative electrode terminal 40 are attached to the sealing plate 14. In the present embodiment the positive electrode terminal 30 is disposed at one end (left end in FIG. 1 to FIG. 3) of the sealing plate 14 in the long-side direction Y. In the present embodiment the negative electrode terminal 40 is disposed at the other end (right end in FIG. 1 to FIG. 3) of the sealing plate 14 in the long-side direction Y. The positive electrode terminal 30 and the negative electrode terminal 40 are examples of terminals.

As illustrated in FIG. 2, the positive electrode terminal 30 is electrically connected to the positive electrode plate 22 (see FIG. 5) of the electrode body 20 via the positive electrode current collector member 50, within the exterior body 12. The positive electrode terminal 30 is inserted through a terminal lead-out hole 18 and is led out from the interior of the sealing plate 14. The positive electrode terminal 30 is insulated from the sealing plate 14 by a respective insulator 70 and a respective gasket 90. The positive electrode terminal 30 is preferably made of a metal, and is more preferably made up of for instance aluminum or an aluminum alloy. An external conductive member 35 is fixed on the positive electrode terminal 30. The positive electrode terminal 30 is joined to the external conductive member 35.

Figure 6:
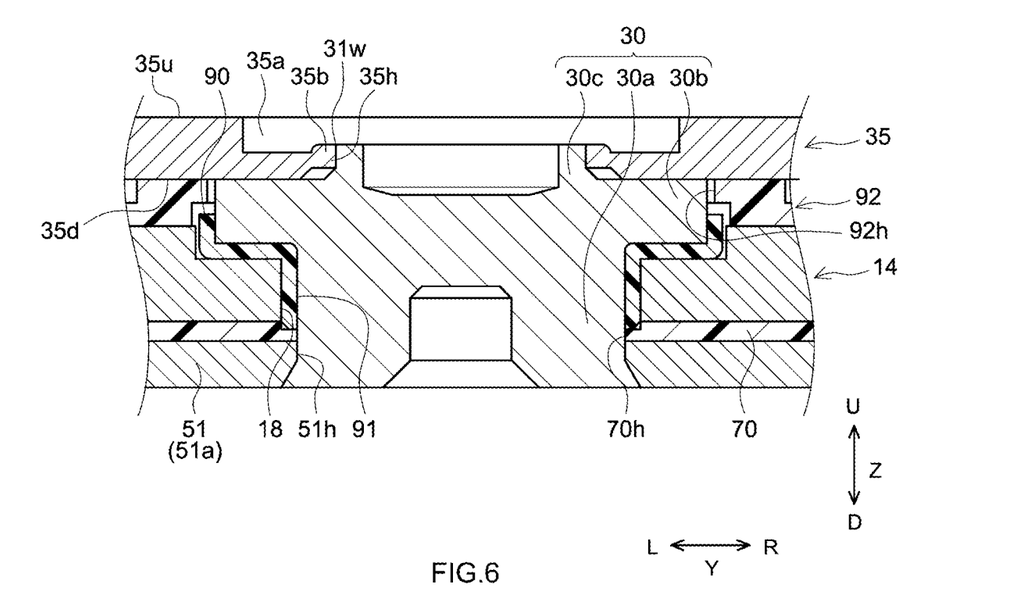
FIG. 6 is a partial enlarged-view diagram of an enlargement of the vicinity of a positive electrode terminal in FIG. 2.
Figure 7:
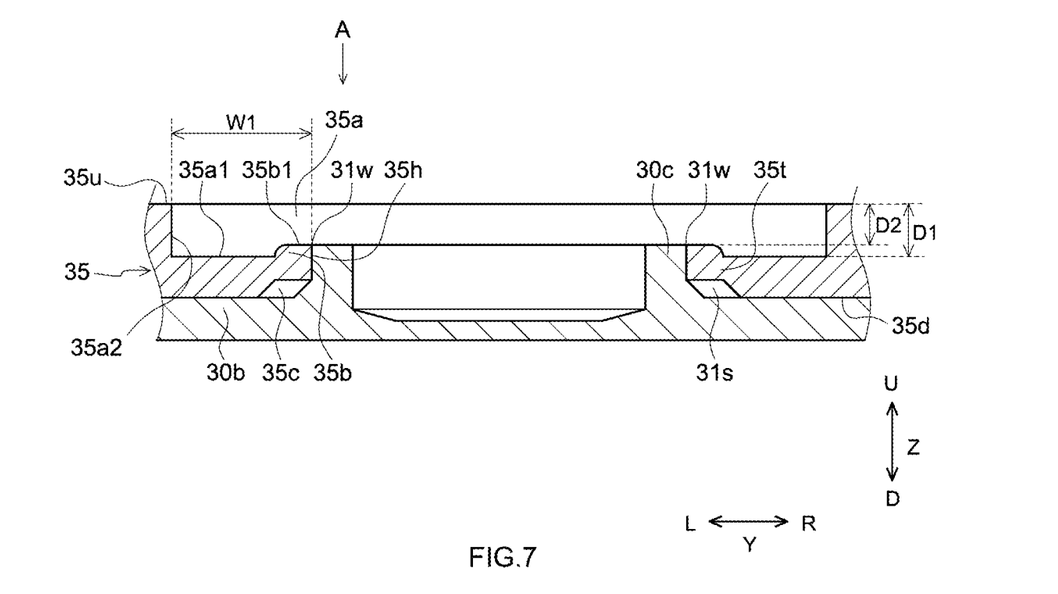
FIG. 7 is a partial enlarged-view diagram of an enlargement of part of FIG. 6.

FIG. 6 is a partial enlarged-view diagram of an enlargement of the vicinity of the positive electrode terminal 30 in FIG. 2. FIG. 7 is a partial enlarged-view diagram of an enlargement of part of FIG. 6. As illustrated in FIG. 6, the positive electrode terminal 30 has an insertion portion 30a, a flange portion 30b, and a projecting portion 30c.

The external shape of the insertion portion 30a is smaller than that of the terminal lead-out hole 18 of the sealing plate 14. In the present embodiment the insertion portion 30a runs through the sealing plate 14 of the battery case 10. As illustrated in FIG. 6, the insertion portion 30a is sequentially inserted, from the sealing plate 14 side, through the interior of a tubular portion 91 of the gasket 90, the terminal lead-out hole 18 of the sealing plate 14, a hole 70h of the respective insulator 70, and a hole 51h of the first collector portion 51. The lower end of the insertion portion 30a is joined to the first collector portion 51 for instance by welding or mechanical joining (crimping or the like).

The flange portion 30b is for instance a portion (large-diameter portion) having a larger external shape than that of the terminal lead-out hole 18 of the sealing plate 14. In the present embodiment the flange portion 30b is disposed at the upper end of the insertion portion 30a. As illustrated in FIG. 6, the flange portion 30b protrudes from the terminal lead-out hole 18, and is disposed outside the battery case 10. The flange portion 30b is disposed on the upper surface of the sealing plate 14 (on the farther surface from the exterior body 12). The flange portion 30b is formed to for instance a substantially circular shape, or a polygonal shape such as a quadrangular shape, in a plan view. For instance an external conductive member 35 is disposed over the flange portion 30b. The flange portion 30b is in direct contact with the external conductive member 35.

The projecting portion 30c is for instance a portion that protrudes upward (away from to the insertion portion 30a), from the upper end of the flange portion 30b. As illustrated in FIG. 6, the projecting portion 30c is disposed in (inserted into) a through-hole 35h of the external conductive member 35. In the present embodiment the projecting portion 30c is joined to the external conductive member 35. A joint portion 31w with the external conductive member 35 is formed on the projecting portion 30c. The projecting portion 30c is formed in a substantially annular shape (preferably a circular ring shape), in a plan view. The projecting portion 30c may however be formed in a columnar shape (solid shape).

The external conductive member 35 is for instance a member joined to the positive electrode terminal 30 outside the battery case 10. The external conductive member 35 has a substantially rectangular shape that is elongated in the long-side direction Y, as illustrated in FIG. 1. The external conductive member 35 is preferably plate-shaped. The external conductive member 35 is for instance made up of a metal. The external conductive member 35 is preferably made up of aluminum or an aluminum alloy. For instance the external conductive member 35 is attached to the sealing plate 14, on the positive electrode side of the secondary battery 1, in a state of being insulated from the sealing plate 14 by a respective external insulating member 92. In the present embodiment a lower surface 35d of the external conductive member 35 is disposed on the sealing plate 14 side. A respective bus bar is joined to the external conductive member 35, for instance during construction of an assembled battery. In the present embodiment a bus bar is joined to an upper surface 35u, on the reverse side from that of the lower surface 35d. The upper surface 35u and the lower surface 35d will be further described further on.

In the present embodiment the external conductive member 35 is joined to the positive electrode terminal 30 at the joint portion 31w.

The terminal and the external conductive member are joined for instance by irradiation with energy rays, for example by laser welding. For instance when energy rays are projected onto the site envisaged for joining, spatter may fly off and adhere to the external conductive member. The inventors endeavored to suppress adhesion of scattered spatter to the external conductive member at the time of joining of the terminal and the external conductive member, and to achieve yet more stable joining between the external conductive member and the bus bar. To that end, the inventors diligently studied the shape of the external conductive member and methods for joining the terminal and the external conductive member.

As illustrated in FIG. 6, the external conductive member 35 has the through-hole 35h. The through-hole 35h is for instance substantially circular in a plan view. In the present embodiment the through-hole 35h is provided closer to one end in the long-side direction (for instance the left end in the width direction Y in FIG. 1) than the center of the external conductive member 35 in the long-side direction. In the present embodiment part of the positive electrode terminal 30 (for instance the projecting portion 30c) is disposed within the through-hole 35h. The joint portion 31w at which the external conductive member 35 and the positive electrode terminal 30 (in the figure, the projecting portion 30c) are joined to each other is provided around the through-hole 35h. In the present embodiment the joint portion 31w is a weld joint provided through welding resulting from projection of energy rays.

The joint portion 31w is provided for instance as a substantially annular shape (for instance a circular ring shape), in a plan view. For instance the formation width (for example the ring width) of the joint portion 31w in the radial direction of the through-hole 35h is preferably set to be 0.5 mm to 0.9 mm, in order to stabilize the joint between the external conductive member 35 and the positive electrode terminal 30. The joint portion 31w is preferably provided continuously. Alternatively, the joint portion 31w may be provided intermittently or in the form of a dashed line. For instance, the joint portion 31w may be provided to be axially symmetrical with respect to the axis of the positive electrode terminal 30.

In the present embodiment, a substantially annular first recess 35a that is sunk from the upper surface 35u of the external conductive member 35 is provided around the through-hole 35h. In the present specification the "upper surface 35u of the external conductive member 35" denotes one end surface of the external conductive member 35, in the direction of penetration into the through-hole 35h (for instance direction Z in FIG. 6), on the reverse side from that of the sealing plate 14. As illustrated in FIG. 6 and FIG. 7, the diameter of the first recess 35a is larger than the diameter of the through-hole 35h. The first recess 35a is provided so as to surround the periphery of the joint portion 31w. As illustrated in FIG. 7, an inner wall surface 35a2 of the first recess 35a extends, substantially vertically, from a bottom surface 35a1 towards the upper surface 35u. The angle formed by the inner wall surface 35a2 and the bottom surface 35a1 is for instance from 80 degrees to 100 degrees. The first recess 35a is an example of the "recess".

In the present embodiment a shortest distance W1 from the peripheral edge of the through-hole 35h to the outer peripheral edge of the first recess 35a in a plan view, as seen from the direction of arrow A in FIG. 7 (hereafter also simply referred to as "distance W1"), is 2 mm or larger (for instance 2.5 mm or larger). When the distance W1 lies within the above range, adhesion of spatter to the upper surface 35u can be suppressed in the production process of the secondary battery 1, and the external conductive member 35 and the bus bar can be more stably joined to each other as a result. From the above standpoint, the distance W1 is preferably 2.5 mm or larger. The distance W1 is for instance 4.0 mm or smaller, and in terms of joining to the bus bar, is preferably 3.5 mm or smaller, and more preferably 3.0 mm or smaller.

As illustrated in FIG. 7, a protrusion 35b is provided within the first recess 35a, on the peripheral edge of the through-hole 35h. The protrusion 35b has for instance a substantially annular shape (for instance a circular ring shape) in a plan view. In the present embodiment the protrusion 35b protrudes from the bottom surface 35a1 of the first recess 35a towards the upper surface 35u. As illustrated in FIG. 7, a tip portion 35b1 of the protrusion 35b in the protrusion direction stands closer to the bottom surface 35a1 than to the upper surface 35u. In the present embodiment the joint portion 31w is provided at the boundary of the tip portion 35b1 and the projecting portion 30c. By providing thus the protrusion 35b, for instance joining through projection of energy rays to the boundary of the external conductive member 35 and the positive electrode terminal 30 can be rendered more efficient, and as a result the output of energy rays is curtailed, whereby spatter can be suppressed, and the effect of suppressing adhesion of spatter can be made yet more pronounced. Formation of the protrusion 35b is however not essential herein, and can be omitted in other embodiments.

A first depth D1 of the first recess 35a is for instance from 0.1 mm to 1.2 mm. In the present specification the "first depth D1 of the first recess 35a" denotes for instance a maximum depth from the upper surface 35u of the external conductive member 35 to the bottom surface 35a1 of the first recess 35a. A second depth D2 of the first recess 35a is for instance 0.05 mm or larger, preferably 0.1 mm or larger, and more preferably 0.5 mm or larger. The second depth D2 is for instance 1.0 mm or smaller, or 0.9 mm or smaller. In the present specification the "second depth D2 of the first recess 35a" denotes for instance the maximum depth from the upper surface 35u of the external conductive member 35 to the tip portion 35b1 of the protrusion 35b. In the present embodiment the second depth D2 may also be defined by the maximum depth from the upper surface 35u to the joint portion 31w.

In the embodiment illustrated in FIG. 7, a substantially annular second recess 35c sunk from the lower surface 35d of the external conductive member 35 is provided around the through-hole 35h. In the present specification the "lower surface 35d of the external conductive member 35" denotes one end surface of the external conductive member 35, in the direction of penetration into the through-hole 35h (for instance direction Z in FIG. 6), on the side of the sealing plate 14. In the present embodiment the second recess 35c opposes the flange portion 30b of the positive electrode terminal 30. The diameter of the second recess 35c is for instance larger than the diameter of the through-hole 35h. A space 31s is secured around the through-hole 35h by providing thus the second recess 35c. The external conductive member 35 can be prevented, by the space 31s, from interfering with the boundary of the flange portion 30b and the projecting portion 30c. Thereby, the external conductive member 35 can be stably disposed on the flange portion 30b, and the occurrence of spatter during welding can be suppressed as a result.

A thin portion 35t becomes formed when providing the second recess 35c. The thickness of the thin portion 35t is smaller than the thickness of other portions, of the external conductive member 35, at which neither the first recess 35a nor the second recess 35c is provided. The thin portion 35t may be configured to melt when for instance a current of 1000 A or larger (for instance a short-circuit current) flows in the secondary battery 1. Formation of the second recess 35c is however not essential herein, and may be omitted in other embodiments.

As illustrated in FIG. 2, the negative electrode terminal 40 is electrically connected to the negative electrode plate 24 (see FIG. 5) of the electrode body 20 via the negative electrode current collector member 60, inside the exterior body 12. The negative electrode terminal 40 is inserted through the terminal lead-out hole 19 and is led out from the interior of the sealing plate 14. The negative electrode terminal 40 is insulated from the sealing plate 14 by a respective insulator 70 and a respective gasket 90. The negative electrode terminal 40 is preferably made of a metal, and is more preferably made up of for instance copper or a copper alloy. The negative electrode terminal 40 may be configured through joining and integration of two conductive members. For instance, the negative electrode terminal 40 may be made up of copper or a copper alloy at a portion connected to the negative electrode current collector member 60, and may be made up of aluminum or an aluminum alloy at a portion exposed outside the sealing plate 14. The negative electrode terminal 40 may be configured out of a cladding material of an aluminum-based metal and a copper-based metal. The concrete configuration of the negative electrode terminal 40 may be identical to that of the positive electrode terminal 30. An external conductive member 45 is fixed on the negative electrode terminal 40. The negative electrode terminal 40 is joined to the external conductive member 45.

The external conductive member 45 is for instance a member joined to the negative electrode terminal 40 outside the battery case 10. For instance the external conductive member 45 is attached to the sealing plate 14, on the negative electrode side of the secondary battery 1, in a state of being insulated from the sealing plate 14 by a respective external insulating member 92. The shape, structure, and constituent materials of the external conductive member 45 may be identical to those of the external conductive member 35 on the positive electrode side.

The positive electrode current collector member 50 is for instance a member that electrically connects the positive electrode plate 22 of the electrode body 20 and the positive electrode terminal 30, inside the exterior body 12. As illustrated in FIG. 2, the positive electrode current collector member 50 has the first collector portion 51 and the second collector portions 52. The first collector portion 51 is formed to have an L-shaped cross section. The first collector portion 51 has for instance a base portion 51a and a lead portion 51b. As illustrated in FIG. 2, the base portion 51a is disposed along the inner surface of the sealing plate 14. The hole 51h is formed in the base portion 51a at a position corresponding to the terminal lead-out hole 18 of the sealing plate 14, as illustrated in FIG. 6. For instance the insertion portion 30a of the positive electrode terminal 30 is inserted through the hole 51h. The lead portion 51b extends for instance from one end of the base portion 51a, in the width direction Y towards the bottom portion 12a. For instance the second collector portions 52 are connected to the lead portion 51b.

As illustrated in FIG. 2 to FIG. 4, the second collector portions 52 extend towards the bottom portion 12a of the exterior body 12. In the present embodiment each second collector portion 52 has a first connecting portion 52a and a second connecting portion 52b. The first connecting portion 52a is for instance a portion electrically connected to the first collector portion 51. In the present embodiment the first connecting portion 52a is connected to the first collector portion 51 via a connection portion 521. The connection portion 521 is for instance a thin portion. For instance, the first connecting portion 52a extends in the vertical direction Z. In the present embodiment the first connecting portion 52a is disposed substantially perpendicularly to the winding axis WL of the respective electrode body 20.

As illustrated in FIG. 3 and FIG. 4, a respective fuse portion 52f is formed in each first connecting portion 52a. The first connecting portion 52a is configured so that the fuse portion 52f fuses when a current of 1000 A or more (for instance a short-circuit current) flows through the secondary battery 1. The fuse portion 52f is for instance a portion of the first connecting portion 52a having a smaller cross-sectional area than that of other portions excluding the fuse portion 52f and the connection portion 521. The fuse portion 52f is for instance an opening or a thin portion. The fuse portion 52f is formed in the first connecting portion 52a, and hence the first connecting portion 52a is configured to fuse upon flow of a current such as the above. Safety is improved as a result.

Each second connecting portion 52b is for instance a portion that is joined to the positive electrode tab group 23. In the present embodiment the second connecting portion extends along the vertical direction Z. The second connecting portion 52b is disposed substantially perpendicular to the winding axis WL of the respective electrode body 20. The surface of the second connecting portion 52b that is connected to the positive electrode tabs 22t is disposed substantially parallelly to the second side walls 12c of the exterior body 12.

The negative electrode current collector member 60 is a member that electrically connects the negative electrode plate 24 of the electrode body 20 and the negative electrode terminal 40, inside the exterior body 12. As illustrated in FIG. 2 to FIG. 4, the negative electrode current collector member 60 has a first collector portion 61 and second collector portions 62. The first collector portion 61 has a base portion 61a and a lead portion 61b. Each second collector portion 62 has a first connecting portion 62a and a second connecting portion 62b. The configuration of the negative electrode current collector member 60 is identical to the configuration of the positive electrode current collector member 50 described above, and hence a detailed description thereof will be omitted herein. In the negative electrode current collector member 60, the reference numeral "621" in FIG. 4 denotes a connecting portion, the reference numeral "62a" denotes a first connecting portion, the reference numeral "62b" denotes a second connecting portion, and the reference numeral "62f" denotes a fuse portion.

The insulator 70 is an insulating member disposed between the positive electrode current collector member 50 and the inner surface of the sealing plate 14. The hole 70h is formed in the insulator 70. The gasket 90 is an insulating member disposed between the positive electrode terminal 30 and the outer surface of the sealing plate 14. The gasket 90 has a hollow cylindrical tubular portion 91 that is inserted into the terminal lead-out hole 18 of the sealing plate 14. The tubular portion 91 of the gasket 90 is disposed along the inner circumference of the hole 70h of the insulator 70. A structure similar to the insulating structure relying on an insulator 70 and a gasket 90 is also provided on the negative electrode terminal 40 side, but a detailed description thereof will be omitted herein.

The constituent materials of the insulators 70 and the gaskets 90 are not particularly limited, and include resin materials such as polyolefin resins (for example polypropylene (PP) and polyethylene (PE)), and fluororesins (for example perfluoroalkoxyalkanes (PFAs) and polytetrafluoroethylene (PTFE)). Such resin materials can also be used as the constituent material of the external insulating members 92.

The secondary battery 1 described above has: the electrode body 20 including the positive electrode plate 22 and the negative electrode plate 24; the battery case 10 that accommodates the electrode body 20; the positive electrode terminal 30 electrically connected to the positive electrode plate 22 and attached to the battery case 10; and the external conductive member 35 joined to the positive electrode terminal 30 outside the battery case 10. The external conductive member 35 has the through-hole 35h. Part of the positive electrode terminal 30 is disposed in the through-hole 35h. The joint portion 31w of the external conductive member 35 and the positive electrode terminal 30 is provided around the through-hole 35h; the substantially annular first recess 35a sunk from the upper surface 35u of the external conductive member 35 is likewise provided around the through-hole 35h. The distance W1 from the peripheral edge of the through-hole 35h to the outer peripheral edge of the first recess 35a in a plan view is 2 mm or larger.

In the secondary battery 1, in other words, the external conductive member 35 and the positive electrode terminal 30 disposed within the through-hole 35h, which is in turn provided within the first recess 35a sunk from the upper surface 35u of the external conductive member 35, are joined in the periphery of the through-hole 35h. The positive electrode terminal 30 and the external conductive member 35 can be joined at a portion recessed from the upper surface 35u of the external conductive member 35. There is a distance of 2 mm or more from the peripheral edge of the through-hole 35h to the outer peripheral edge of the first recess 35a, in a plan view. The upper surface 35u can be kept removed from the joint site of the positive electrode terminal 30 and the external conductive member 35, and adhesion of spatter to the upper surface 35u can be suppressed at the time of joining. The external conductive member 35 and the bus bar can be joined more stably as a result.

The secondary battery 1 can be used in various applications, and for instance the battery can be suitably used as a power source (drive power source) for a motor, mounted on a vehicle such as a passenger car or a truck. The kind of vehicle is not particularly limited, and examples thereof include plug-in hybrid electric vehicles (PHEVs), hybrid electric vehicles (HEVs) and electric vehicles (BEVs).

Method for Producing the Secondary Battery 1

The above-described battery case 10, electrode body 20, positive electrode terminal 30, negative electrode terminal 40, external conductive members 35, 45, positive electrode current collector member 50, negative electrode current collector member 60, insulators 70, gaskets 90 and external insulating members 92 are prepared, and the secondary battery 1 is produced in accordance with a production method that includes for instance an attachment step, an arrangement step, a covering step and a joining step. The production method may include further steps at any stage. The explanation below will refer to FIG. 1 to FIG. 9 as appropriate.

In the attachment step, for instance, the positive electrode terminal 30 is attached to the battery case 10. In the present embodiment, firstly the positive electrode terminal 30, a respective gasket 90, the first collector portion 51, and a respective insulator 70 are attached to the sealing plate 14.

The positive electrode terminal 30, the first collector portion 51, and the insulator 70 are fixed to the sealing plate 14 for instance by crimping (riveting). In the crimping process, as illustrated in FIG. 6, the gasket 90 is clamped between the outer surface of the sealing plate 14 and the positive electrode terminal 30, and the insulator 70 is clamped between the inner surface of the sealing plate 14 and the first collector portion 51. For instance, the insertion portion 30a of the positive electrode terminal 30 prior to crimping is sequentially inserted, from above the sealing plate 14, into the tubular portion 91 of the gasket 90, the terminal lead-out hole 18 of the sealing plate 14, the hole 70h of the insulator 70, and the hole 51h of the first collector portion 51, so as to protrude downward of the sealing plate 14. The section of the insertion portion 30a that protrudes downward of the sealing plate 14 is crimped so that a compressive force is exerted in the vertical direction Z. The negative electrode terminal 40, a respective gasket 90, the first collector portion 61 and a respective insulator 70 are fixed to the sealing plate 14 in accordance with a similar procedure.

In the arrangement step, for instance, a portion of the positive electrode terminal 30 attached to the battery case 10 is disposed within the through-hole 35h of the external conductive member 35. In the present embodiment, the attachment step is followed by arrangement of the respective external insulating member 92 from above the sealing plate 14, so that the flange portion 30b of the positive electrode terminal 30 and the gasket 90 are accommodated within a hole 92h of the external insulating member 92. The external conductive member 35 is superimposed next on the positive electrode terminal 30, from above the sealing plate 14 in such a manner that the lower surface 35d and the flange portion 30b face each other, and the projecting portion 30c is inserted into the through-hole 35h. On the negative electrode side as well, for instance a portion of the negative electrode terminal 40 (for instance the projecting portion of the negative electrode terminal 40) attached to the battery case 10 is arranged (not shown) into a through-hole of the external conductive member 45, in accordance with a similar procedure.

Figure 8:
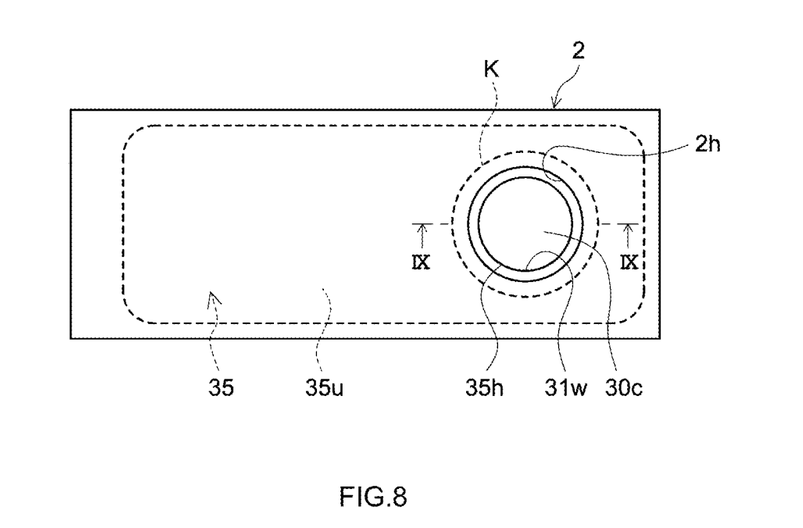
FIG. 8 is a diagram for explaining a step in a production method according to an embodiment.
Figure 9:
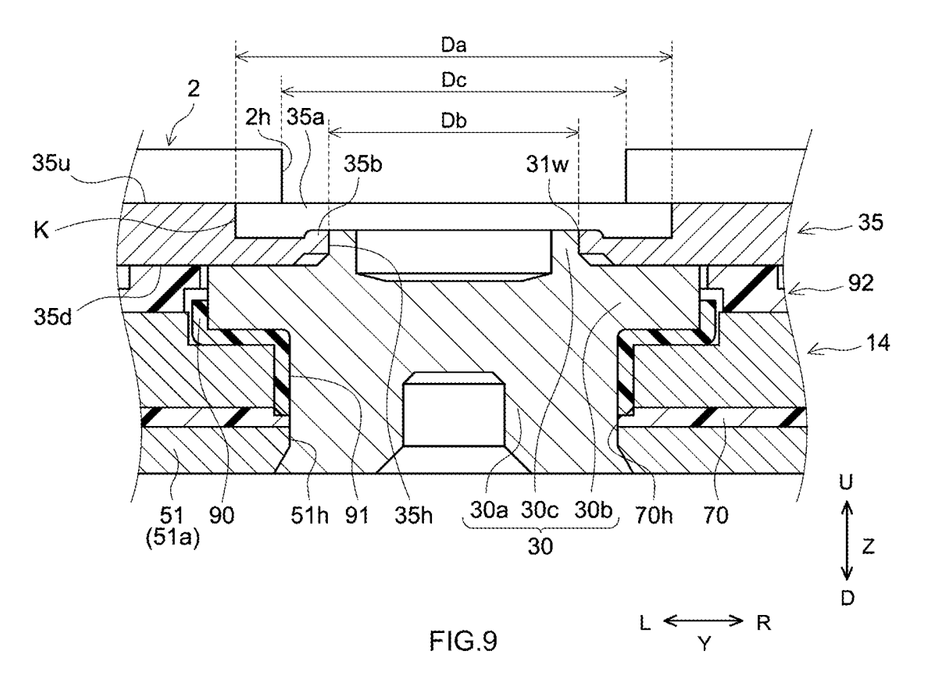
FIG. 9 is a diagram for explaining a step in a production method according to an embodiment.

In the covering step, for instance at least part of the upper surface of the external conductive member 35 is covered with a cover member, after the arrangement step. FIG. 8 and FIG. 9 are diagrams for explaining a step in the production method according to an embodiment. FIG. 8 is a diagram illustrating a state in which the upper surface 35u of the external conductive member 35 is covered with a cover member 2, after the arrangement step, as viewed from the upper surface 35u. FIG. 9 is a partial cross-sectional diagram viewed from the direction of arrow IX in FIG. 8. The cover member 2 is not particularly limited, but is for instance a component of an apparatus used for producing the secondary battery 1. Although not particularly limited thereto, the cover member 2 is preferably made of a resin or a metal. The constituent material of the cover member 2 is preferably a material that is not prone to melting or deforming during the joining step described below.

In the present embodiment an opening 2h is formed in the cover member 2. As illustrated in FIG. 8, the opening 2h has an annular shape in a plan view. Preferably, an inner diameter Dc of the opening 2h is smaller than an outer diameter Da of the first recess 35a. By using the cover member 2 having formed therein an opening high a smaller inner diameter than the outer diameter Da of the first recess 35a it becomes possible to yet better prevent adhesion, to the upper surface 35u, of spatter generated in the joining step. In the present specification the "outer diameter Da of the first recess 35a" denotes the diameter (labeled with reference symbol K in FIG. 8 and FIG. 9) of the first recess 35a in the upper surface 35u of the external conductive member 35, as illustrated in FIG. 9. In the present embodiment, the inner diameter Dc of the opening 2h is larger than an inner diameter Db of the through-hole 35h.

In the covering step, as illustrated in FIG. 8 and FIG. 9, the upper surface 35u is covered by the cover member 2 in such a manner that an inner edge of the opening 2h of the cover member 2 is disposed between a planned joint portion 31w of the external conductive member 35 and the positive electrode terminal 30, and the outer peripheral edge (labeled with reference symbol K in FIG. 8 and FIG. 9) of the first recess 35a, in a cross-sectional view along the direction of penetration of the through-hole 35h (direction Z in FIG. 9). The planned joint portion 31w is for instance a site that yields the joint portion 31w (see FIG. 6 and FIG. 7) after the below-described joining step has been carried out. For instance, the planned joint portion 31w lies at the boundary of the peripheral edge of the through-hole 35h and the outer edge of the projecting portion 30c.

In the embodiment illustrated in FIG. 8 the cover member 2 covers all the portions of the upper surface 35u of the external conductive member 35, except for the first recess 35a.

In the joining step, for instance, the external conductive member 35 and the positive electrode terminal 30 are joined by being irradiated with energy rays, after the covering step. For instance the joint portion 31w (see FIG. 6 and FIG. 7) is formed thus as a result of the joining step. In the covering step, the external conductive member 35 and the positive electrode terminal 30 are joined in a state where the edge portion of the opening 2h of the cover member 2 is disposed between the planned joint portion 31w of the external conductive member 35 and the positive electrode terminal 30, and the outer peripheral edge of the first recess 35a, in a cross-sectional view along the direction of penetration of the through-hole 35h (direction Z in FIG. 9). The external conductive member 35 and the positive electrode terminal 30 are joined in a state where the upper surface 35u around the through-hole 35h is covered with the cover member 2; this allows suppressing, as a result, adhesion of spatter to the upper surface 35u.

The energy used for energy ray irradiation herein is for instance light energy, electron energy or thermal energy. In the joining step, the joint portion 31w is formed for instance by relying on a welding means such as laser welding, electron beam welding, ultrasonic welding, resistance welding or TIG (Tungsten Inert Gas) welding. Laser welding can be preferably resorted to among the foregoing.

After the joining step, for instance the electrode body 20 is attached to the construct obtained in the joining step. A conventionally known method may be resorted to, without particular limitations, as the method for producing the electrode body 20. In the present embodiment the second collector portion 52 of the positive electrode current collector member 50 is attached to the positive electrode tab group 23 of the electrode body 20, and the second collector portion 62 of the negative electrode current collector member 60 is attached to the negative electrode tab group 25. Next, the second collector portions 52, 62 attached to the electrode body 20 are in turn respectively attached to the first collector portions 51, 61 of identical polarity in the construct obtained in the joining step. The electrode body 20 is accommodated next in the electrode body holder 29. The electrode body 20 covered with the electrode body holder 29 is inserted next into the exterior body 12. In this state, the sealing plate 14 is laid on the opening 12h of the exterior body 12, and the foregoing are welded, to thereby seal the exterior body 12.

Once the exterior body 12 has been sealed, an electrolyte solution is injected thereafter into the battery case 10 through the liquid injection hole 15, in accordance with a conventionally known method. After injection of the electrolyte solution, the liquid injection hole 15 is sealed using the sealing member 16. The liquid injection hole 15 is plugged for instance by a metal-made sealing plug that is used herein as the sealing member 16. The liquid injection hole 15 is sealed next for instance by laser welding in a state where the liquid injection hole 15 has been closed with the sealing member 16. The above sealing is for instance followed by an initial charging treatment and an aging treatment performed under predetermined conditions; a secondary battery 1 in a usable state can be obtained.

Battery Assembly 100

Figure 10:
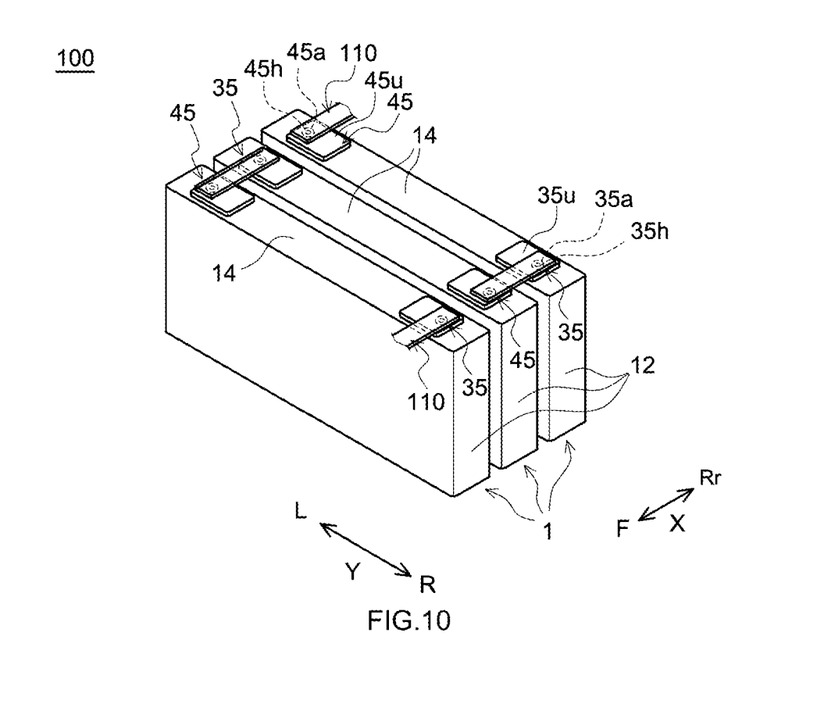
FIG. 10 is a perspective-view diagram of an assembled battery according to an embodiment.

The secondary battery 1 can be suitably used for instance as a unit cell that makes up an assembled battery. FIG. 10 is a perspective view of an assembled battery according to an embodiment. In an assembled battery 100, as illustrated in FIG. 10, multiple secondary batteries 1 are electrically connected to each other via respective bus bars 110. In the present embodiment a respective bus bar 110 is disposed between the upper surface 35$u$ of the external conductive member 35 on the positive electrode side of one of two adjacent secondary batteries 1 and an upper surface 45$u$ of the external conductive member 45 on the negative electrode side of the other secondary battery 1. The secondary batteries 1 are connected to each other via these bus bars 110. As described above, adhesion of spatter to the upper surface 35$u$ of the external conductive member 35 (herein the surface to which the bus bar 110 is joined) is suppressed in the secondary battery 1. As a result, the bus bar 110 can be more stably joined to the external conductive member 35.

The bus bar 110 is for instance a plate-like (rod-like) member. The bus bar 110 has a substantially rectangular shape elongated in direction X. The external conductive members 35, 45 and the bus bar 110 are electrically connected for instance by welding such as laser welding. The bus bar 110 is made up of a conductive metal such as aluminum, an aluminum alloy, nickel or stainless steel.

In the embodiment illustrated in FIG. 10, each bus bar 110 respectively covers the through-hole 35$h$ and the first recess 35$a$ on the positive side, and covers a through-hole 45$h$ and a first recess 45$a$ on the negative side. In consequence, energization paths in the assembled battery 100 can be made shorter, and energization-derived generation of heat can be suppressed as a result. For instance 50% or more (preferably 70% or more, and more preferably 80% or more) of the surface area of the first recess, in a plan view, may be covered with the bus bar 110.

Method for Producing the Assembled Battery 100

A method for producing the assembled battery 100 includes for instance producing secondary batteries 1 as unit cells, and arranging respective bus bars 110 on the upper surfaces 35$u$, 45$u$ of the external conductive members 35, 45, to thereby connect the external conductive members. For instance, multiple secondary batteries 1 are disposed such that respective first side walls 12$b$ oppose each other. Herein two adjacent secondary batteries 1 are disposed in an array direction of the secondary battery 1 (direction X in FIG. 10) in such a manner that the external conductive member 35 and the external conductive member 45 are adjacent to each other in the array direction. Next, the adjacent external conductive member 35 and external conductive member 45 are connected to each other by being bridged over by a respective bus bar 110. The assembled battery 100 can then be produced for instance by being clamped, from both ends in the arrangement direction, by a pair of end plates, with a predetermined restraining pressure being imparted by bind bars that bridge the end plates. In the secondary battery 1, adhesion of spatter to upper surface 35$u$ of the external conductive member 35 (herein the surface to which the bus bar 110 is joined) is suppressed, as described above. As a result, the bus bar 110 can be joined more stably to the external conductive member 35.

Concrete examples of the art disclosed herein have been explained in detail above, but these are merely illustrative in nature, and are not meant to limit the scope of the claims. The art set forth in the claims encompasses various modifications and alterations of the concrete examples illustrated above.

Second Embodiment

Figure 11:
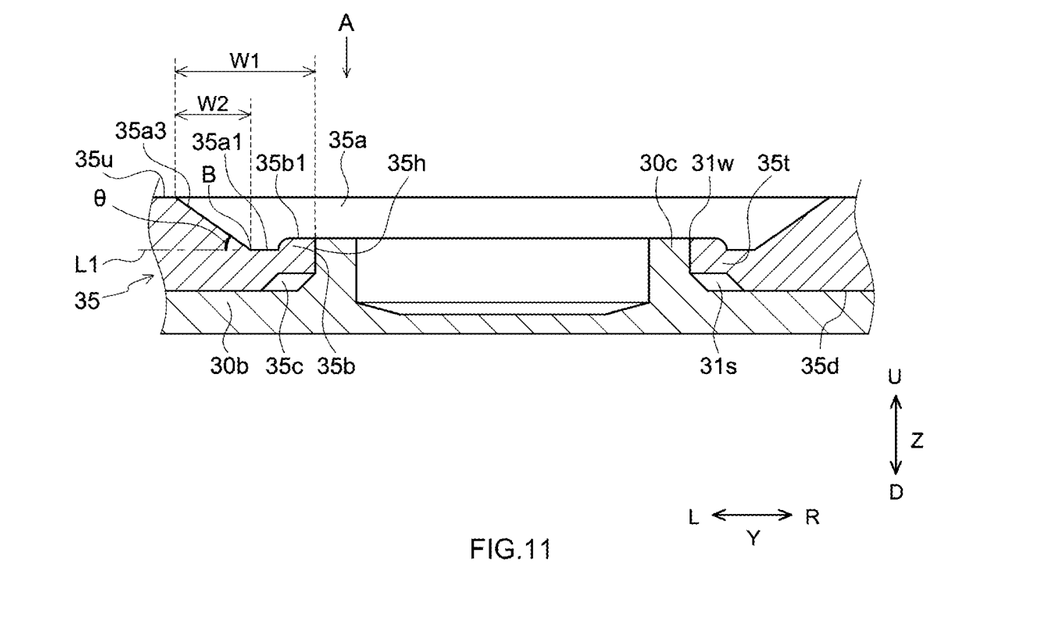
FIG. 11 is a partial enlarged-view diagram of an enlargement of the vicinity of a positive electrode terminal in another embodiment.

In the first embodiment the inner wall surface 35$a$2 of the first recess 35$a$ is substantially perpendicular to the bottom surface 35$a$1. However, the invention is not limited thereto. FIG. 11 is a partial enlarged-view diagram of an enlargement of the vicinity of a positive electrode terminal in another embodiment. FIG. 11 illustrates a cross-sectional view along the direction of penetration (direction Z in the figure) of the through-hole 35$h$. In the embodiment illustrated in FIG. 11, an inner wall surface 35$a$3 of the first recess 35$a$ is a tapered surface that becomes wider from the bottom surface 35$a$1 of the first recess 35$a$ towards the upper surface 35$u$ of the external conductive member 35. The amount of metal in the outer peripheral edge of the first recess 35$a$ can be reduced by forming thus the inner wall surface 35$a$3 as a tapered surface. During formation of the first recess 35$a$, the metal on the outer peripheral edge of the first recess 35$a$ escapes in the radial direction of the first recess 35$a$, and thus the outer peripheral edge may bulge up as a result. Such bulging can be curtailed, and deformation of the external conductive member can be suppressed, by forming the inner wall surface 35$a$3 as a tapered surface. Moreover, stress can be prevented from concentrating at the thin portion 35$t$ on account of external forces. In addition, the heat capacity of the external conductive member 35 can be increased, which allows reducing generation of heat during energization. In the explanation that follows the inner wall surface 35$a$3 is also referred to as "tapered surface 35$a$3".

In the present embodiment an inclination angle $\theta$ of the inner wall surface 35$a$3 is smaller than 80 degrees, and is preferably 45 degrees or less. The inclination angle $\theta$ is more preferably from 20 degrees to 40 degrees, and yet more preferably from 25 degrees to 35 degrees, in terms of better bringing out the above-described effects. In the present specification the "inclination angle $\theta$ of the inner wall surface 35$a$3" denotes for instance the angle formed by the inner wall surface 35$a$3 and a straight line L1 along the bottom surface 35$a$1, in the cross-sectional view illustrated in FIG. 11.

In the present embodiment a ratio (W2/W1) of the above-described distance W1 and a shortest distance W2 from a boundary B of the tapered surface 35$a$3 and the bottom surface 35$a$1 up to the outer peripheral edge of the first recess 35$a$ (hereafter also referred to as "distance W2"), in a plan view from the direction of arrow A in FIG. 11, is 0.4 or higher. The ratio (W2/W1) is preferably 0.5 or higher, in terms of better bringing out the above-described effects.

In the production method of the secondary battery of the second embodiment there is used the external conductive member 35 having the inner wall surface 35$a$3 exhibiting the above-described tapered surface. In the covering step, for instance, the upper surface 35$u$ of the external conductive member 35 may be covered with the cover member 2 so that the inner edge of the opening 2$h$ of the cover member 2 overlaps the tapered surface 35$a$3 (see FIG. 9 and FIG. 11). The present embodiment allows suppressing adhesion of spatter, generated in the joining step, to peripheral members, and curtailing deformation of the outer peripheral edge of the first recess 35$a$, as described above. The reliability of joint portions between members that make up the secondary battery 1 or the assembled battery 100 can be improved accordingly.

The shape of the first recess 35$a$ is not particularly limited, provided that the shape allows bringing out the effects of the art disclosed herein. Except for the above-described features, the explanation of the first embodiment applies likewise to the second embodiment, and hence a redundant explanation will be omitted.

Other Embodiments

In the first embodiment above the cover member 2 covers the entire upper surface 35u of the external conductive member 35, as illustrated in FIG. 8. However, the surface area covered by the cover member 2 is not particularly limited, so long as it allows bringing out the effects of the art disclosed herein. From this standpoint, the surface area covered by the cover member 2 is preferably 50% or more, more preferably 70% or more, and yet more preferably 90% or more, of the surface area of the upper surface 35u.

The electrode body 20 in the first embodiment is a wound electrode body. However, the invention is not limited thereto, and a laminated electrode body may be used instead.

What is claimed is:

1. A method for producing a secondary battery that comprises:
an electrode body comprising a positive electrode and a negative electrode;
a battery case that accommodates the electrode body;
a terminal electrically connected to the positive electrode or the negative electrode, and attached to the battery case; and
an external conductive member having a through-hole, and joined to the terminal outside the battery case;
the method comprising:
an attachment step of attaching the terminal to the battery case;
an arrangement step of arranging part of the terminal which is attached to the battery case, within the through-hole of the external conductive member;
a covering step of, after the arrangement step, covering at least part of an upper surface of the external conductive member with a cover member; and
a joining step of, after the covering step, joining the external conductive member and the terminal through irradiation with energy rays,
wherein
the external conductive member comprises a substantially annular recess, sunk from the upper surface of the external conductive member, around the through-hole; and
in the joining step, in a cross-sectional view along a direction of penetration into the through-hole, the external conductive member and the terminal are joined in a state where an edge portion of the cover member is disposed between a planned joint portion of the external conductive member and the terminal, and an outer peripheral edge of the recess.

2. The production method according to claim 1, wherein the cover member has an opening; and
the inner diameter of the opening is smaller than the outer diameter of the recess.

3. The production method according to claim 1, wherein in a plan view, a region of overlap of the cover member and the recess has an annular shape.

4. The production method according to claim 1, wherein in a plan view, a shortest distance W1 from a peripheral edge of the through-hole up to the outer peripheral edge of the recess is 2 mm or larger.

5. The production method according to claim 1, wherein an inner wall surface of the recess is a tapered surface that widens from a bottom surface of the recess towards the upper surface of the external conductive member.

6. The production method according to claim 5, wherein, the cover member having an opening is used in the covering step;
the upper surface of the external conductive member is covered by the cover member; and,
an inner edge of the opening overlaps the tapered surface.

7. The production method according to claim 5, wherein a ratio (W2/W1) of a shortest distance W1 from a peripheral edge of the through-hole up to the outer peripheral edge of the recess in a plan view, and a shortest distance W2 from a boundary of the tapered surface and the bottom surface up to the outer peripheral edge of the recess in a plan view is 0.4 or higher.

8. A method for producing an assembled battery in which multiple unit cells are connected to each other with a bus bar, the method comprising the steps of:
producing a secondary battery as the unit cell, in accordance with the production method according to claim 1; and
arranging the bus bar on the upper surface of the external conductive member, and connecting the external conductive member and the bus bar.

\* \* \* \* \*